United States Patent [19]

Seed

[11] Patent Number: 4,791,782
[45] Date of Patent: Dec. 20, 1988

[54] FLUID OUTLET DUCT

[75] Inventor: Bernard E. Seed, Nottingham, England

[73] Assignee: Rolls-Royce plc, London, England

[21] Appl. No.: 76,711

[22] Filed: Jul. 22, 1987

[30] Foreign Application Priority Data

Aug. 27, 1986 [GB] United Kingdom ................. 8620736

[51] Int. Cl.$^4$ .............................................. F02K 3/04
[52] U.S. Cl. ..................... 60/226.1; 60/242; 60/263; 60/271; 60/39.83; 137/599; 137/883; 239/265.25
[58] Field of Search ................... 60/226.1, 226.3, 239, 60/242, 262, 263, 271, 39.07, 39.83; 137/599, 594, 883; 239/265.25, 265.27

[56] References Cited

U.S. PATENT DOCUMENTS

| 3,478,965 | 11/1969 | Llewellyn | 239/265.25 |
| 3,508,604 | 4/1970 | Foust | 137/594 |
| 3,769,797 | 11/1973 | Stevens | 60/226.1 |
| 4,030,523 | 6/1977 | Cram et al. | 137/599 |
| 4,086,761 | 5/1978 | Schaut et al. | 60/226.1 |
| 4,254,618 | 3/1981 | Elovic | 60/226.1 |
| 4,313,465 | 2/1982 | Holzem et al. | 137/599 |
| 4,474,001 | 10/1984 | Griffin et al. | 60/226.1 |

FOREIGN PATENT DOCUMENTS

| 652991 | 2/1947 | United Kingdom. | |
| 2131883 | 6/1984 | United Kingdom | 60/263 |

Primary Examiner—Donald E. Stout
Attorney, Agent, or Firm—Cushman, Darby & Cushman

[57] ABSTRACT

The invention relates to fluid outlet ducts particularly cooling air outlet ducts of a gas turbine engine. A fluid outlet duct for a gas turbine engine is divided across its width into a plurality of second plenum chambers, each of the second plenum chambers has an associated exit nozzle located in the casing of the gas turbine engine for discharging cooling air. The cooling air from a heat exchanger is supplied through a first plenum chamber to each of the second plenum chambers. Each of the second plenum chambers has a valve to vary the flow of cooling into the second plenum chambers so that the total flow area of the fluid outlet duct may be varied to obtain relatively high exit velocities for the cooling air to give good thrust recovery.

10 Claims, 3 Drawing Sheets

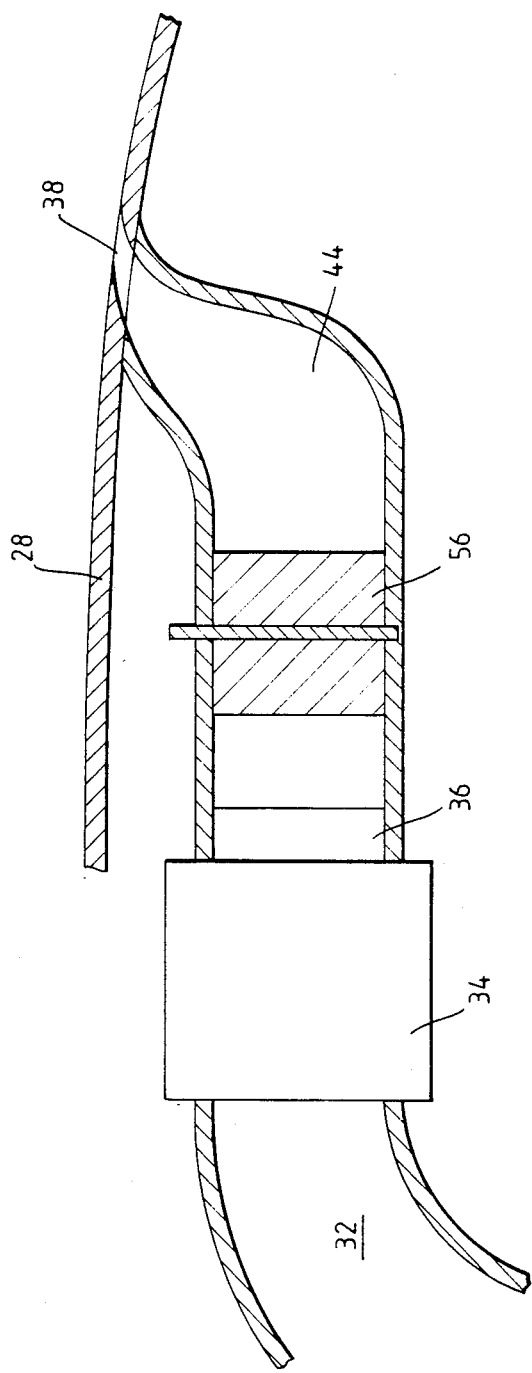

FLUID OUTLET DUCT

The present invention relates to fluid outlet ducts, particularly for air outlet ducts of a gas turbine engine.

The accessory gearbox and generators etc of a gas turbine engine are cooled by cooling air supplied from a fan, a compressor or compressors of the gas turbine engine. The cooling air generally passes through a heat exchanger and is then directed through ducting to an exit nozzle in the engine casing to give thrust recovery.

One of the problems associated with this arrangement is that minimising of the cooling airflow to just satisfy the minimum cooling requirements, by the use of any commonly available valve, has a result that the exit velocity of the cooling air discharging from the exit nozzle will be relatively low for most normal conditions. Consequently the thrust recovery of this arrangement is relatively low for these conditions.

The use of a variable area exit nozzle to regulate the cooling airflow and ensure high exit velocities for the cooling air discharging from the exit nozzle and relatively good thrust recovery is postulated, but such an arrangement is difficult to produce for locations on the curved surface of gas turbine engine casings. These arrangements of exit nozzles would result in non smooth surfaces for external air flow over the casing, or a poor internal aerodynamic shape of the duct and exit nozzle or a combination of both. These exit nozzles are not simple, and have high mechanical failure rates.

The present invention seeks to provide an outlet duct which has relatively high exit velocities for the cooling air for thrust recovery, and which is relatively simple.

Accordingly the present invention provides an outlet duct system for a gas turbine engine comprising a first plenum chamber supplied with fluid, a plurality of second plenum chambers arranged across the width of the outlet duct and supplied with fluid from the first plenum chamber, each of the second plenum chambers having an associated exit nozzle for discharging the fluid, the exit nozzles being located in the casing of the gas turbine engine, each of the second plenum chambers having valve means to vary the flow of the fluid into each of the second plenum chambers whereby the total flow area of the fluid outlet duct may be varied to obtain relatively high exit velocities for the fluid discharging from each of the exit nozzles of the second plenum chambers to give good thrust recovery.

A third plenum chamber may be arranged across the width of the outlet duct and is supplied with fluid from the first plenum chamber, the third plenum chamber has an associated exit nozzle for discharging the fluid, the exit nozzle is located in the casing of the gas turbine engine, the third plenum chamber always allowing a minimum flow of fluid at relatively high exit velocitites for the fluid discharging from the exit nozzle of the third plenum chamber to give good thrust recovery.

The valve means may comprise a two position on/off valve, or a valve whose position is continuously variable between open and closed.

The valve means may comprise a butterfly valve, a ganged butterfly valve or a louvre valve.

Each of the second plenum chambers and associated exit nozzles may have the same flow area.

Each of the second plenum chambers and associated exit nozzles have different flow areas, the flow areas of the second plenum chambers increasing sequentially, for example by a factor of two.

The fluid outlet duct may discharge cooling air from a heat exchanger for an accessory gearbox or generator.

The fluid outlet duct may be in the fan casing of the gas turbine engine.

The present invention will be more fully described by way of example with reference to the accompanying drawings in which:

FIG. 2 is an enlarged longitudinal section through the outlet duct according to the present invention.

Figure 1:
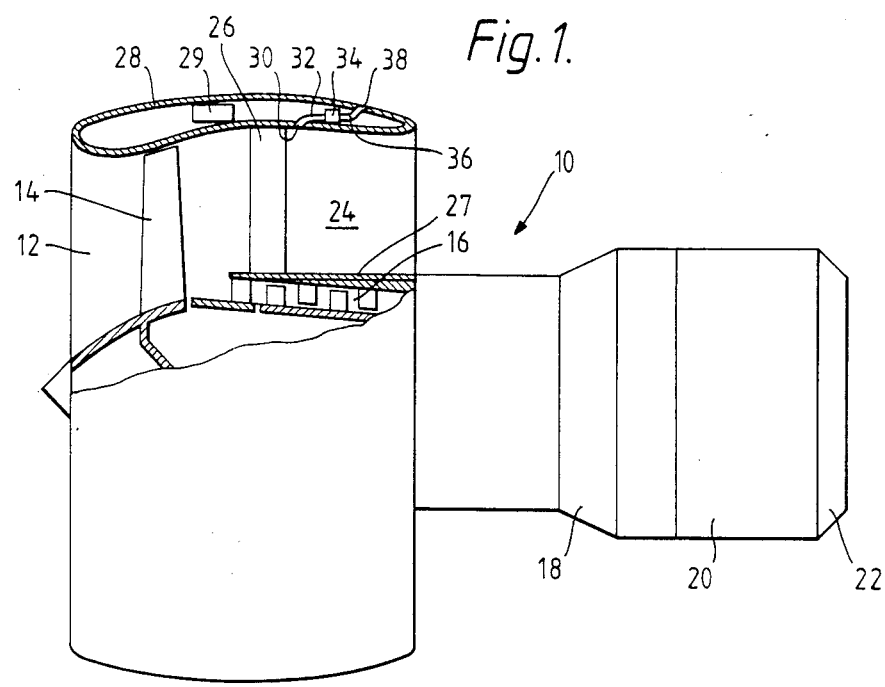
FIG. 1 is a partially cut away view of a gas turbine engine showing an outlet duct according to the present invention.

A turbofan gas turbine engine 10 is shown in FIG. 1 and comprises in flow series an inlet 12, a fan 14, a compressor or compressors 16, a combustor 18, a turbine 20 and an exhaust nozzle 22. The fan operates in a fan duct 24 partially defined by a fan casing 28 which encloses the fan duct. The fan casing 28 is secured to the core engine casing 27 by a plurality of circumferentially arranged outlet guide vanes 26. The turbofan operates conventionally in that air is initially compressed by the fan 14 and a portion of the air flows into the compressor 16. This air is further compressed and is supplied to the combustor 18 where fuel is burnt in the compressed air to produce hot gases which drive the turbines 20 before passing to the atmosphere through the exhaust nozzle 22. The remainder of the air compressed by the fan flows through the fan duct 24 to provide thrust. The turbines 20 drive the compressor 16 and fan 14 via shafts (not shown).

The gas turbine engine also has accessory gearboxes and generators 29 which may be positioned on the fan casing 28. The accessory gearbox or generator 29 is cooled by passing the gearbox or generator lubricant, i.e. oil, through a heat exchanger 34, and cooling air passing through the heat exchanger 34 removes heat from the lubricant. The cooling air is tapped from the fan duct 24, through an opening 30 in the fan casing 28, and flows through a supply duct 32 to the heat exchanger 34. The cooling air is then directed through an outlet duct 36 to an exit nozzle 38 in the exterior surface of the fan casing 28.

Prior art outlet ducts are aerodynamically shaped to achieve good thrust recovery, but as mentioned previously minimising the airflow in order to just satisfy the cooling requirements, by the use of any commonly available valve, has a result that the exit velocity of the air discharging from the exit nozzle of the outlet duct will be relatively low for most normal conditions. As a result the thrust recovery of the arrangement is relatively low for these conditions.

Figure 3:
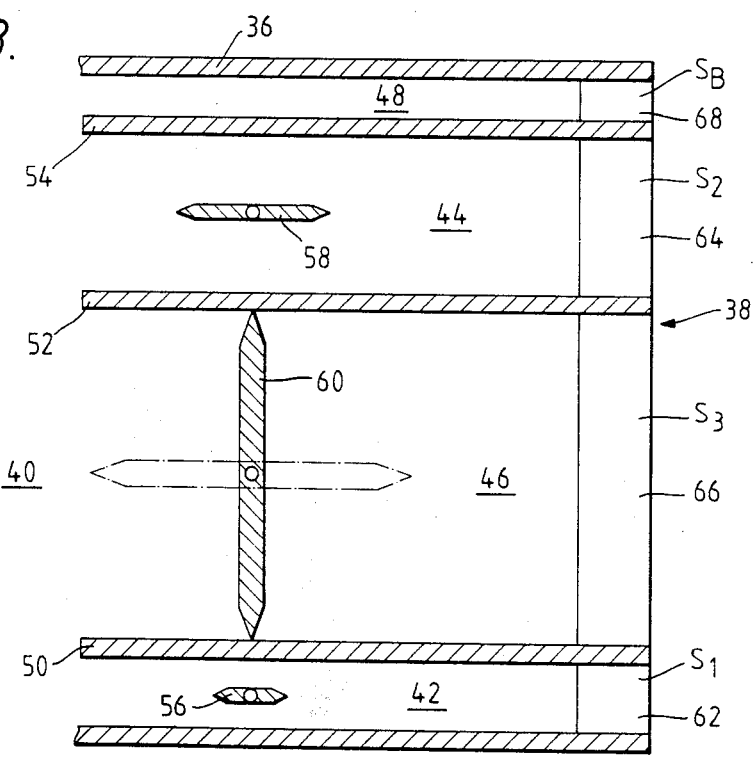
FIG. 3 is a section along line A—A through the outlet duct in FIG. 2.

The outlet device 36 according to one embodiment of the present invention is shown in FIGS. 2 and 3 and comprises a first common plenum chamber 40 which supplies cooling air into a plurality of second plenum chambers 42, 44 and 46 which extend lengthwise of the outlet duct. The second pluenum chambers are arranged across the width of the outlet duct, and all have the same longitudinal cross-sectional aerodynamic shape, and are formed by dividing walls 50, 52 and 54 which extend lengthwise of the outlet duct. Each of the second plenum chambers 42, 44 and 46 has a separate exit nozzle 62, 64 and 66 respectively which form a part of the exit nozzle 38, and, are arranged circumferentially in the fan casing 28. The aerodynamic shape and dimensions of the prior art outlet duct are preserved in the outlet duct 36 by using the existing outlet duct but dividing it widthways into second plenum chambers.

The second plenum chambers 42, 44 and 46 are provided with valves 56, 58 and 60 respectively, and in this embodiment are butterfly valves, but any valve of similar function which has a low resistance to flow when fully open may be used, such as ganged multispindle butterfly valves or louvre valves.

A third plenum chamber 48 is also supplied with cooling air from the first plenum chamber 40, and the third plenum chamber also extends lengthwise and is arranged across the width of the outlet duct 36 between dividing wall 54 and the outlet duct wall. The third plenum chamber 48 has an exit nozzle 68, but is not provided with a valve, to always allow a cooling air flow therethrough.

In operation the outlet duct 36 will allow the minimum cooling airflow to just satisfy the minimum cooling requirements of the accessory gearbox and generators without reducing the exit velocity of the cooling air to relatively low values. At minimum cooling airflow the valves 56, 58 and 60 of the second plenum chambers 42, 44 and 46 respectively are closed, and so all the cooling air flows through the third plenum chamber 48 and exit nozzle 68. The exit nozzle 68 has a smaller flow area than the prior art outlet duct with the single valve, i.e. the exit nozzle 38 and the airflow discharging from the exit nozzle 68 has a greater velocity to give good thrust recovery.

As the cooling requirement for the accessory gearbox and generator increases the valves 56, 58 and 60 of the second plenum chambers 42, 44 and 46 respectively may be opened to sequentially increase the total exit nozzle area which maintaining relatively high exit velocities through each of the exit nozzles 62, 64 and 66 when open.

When the valve is fully open in a second plenum chamber the resistance to flow can be made relatively small, and substantially the entire pressure drop across the second plenum chamber and associated exit nozzle assembly occurs across the exit nozzle, this permits high exit velocities of the cooling air giving good thrust recovery.

The dimensions of the second plenum chambers and the associated exit nozzles may or may not be equal, and it may be of advantage to have second plenum chambers and associated exit nozzles of different dimensions i.e. flow area.

By way of example, suppose the outlet duct has been divided into n second plenum chambers and associated exit nozzles employing two state valves.

Let the exit nozzle areas $S_i$ be numbered in ascending size such that $S_i < S_{i+1}$ for all $i < n$ and $S_1 > 0$.

Also suppose there is no third chamber. Furthermore let $S_{i+1} = 2S_i$ for all $i < n$.

Now since the total flow area of the outlet duct system will be equal to the sum of the individual exit nozzle areas of the second plenum chambers for which the valves are open, then it may be easily established that the total flow area of the outlet duct will belong to the product of initial area $S_i$ and the sequence 0,1,2,3,4,5,6,7 etc, the extent depending on n the number of second plenum chambers and associated exit nozzles.

Thus for three second plenum chambers 42, 44 and 46 with associated exit nozzles 62, 64 and 66, and one unvalved third plenum chamber 48 which associated exit nozzle 68 of flow area $S_B$, the total flow area of the outlet duct would belong to the sequence $S_B$, $S_B+S_1$, $S_B+2S_1$, $S_B+3S_1$, $S_B+4S_1$, $S_B+5S_1$, $S_B+6S_1$, $S_B+7S_1$, which may be arranged from all the switching combination of the two states valves 56, 58 and 60.

As seen in FIG. 2 and 3 the dimensions of the second plenum chambers with associated exit nozzles are not equal, and the flow area $S_2$ of the exit nozzle 64 of the second plenum chamber 44 is twice the flow area $S_1$ of the exit nozzle 62 of the second plenum chamber 42, and the flow area $S_3$ of the exit nozzle 66 of the second plenum chamber 46 is twice the flow area $S_2$ of the exit nozzle 64 of the second plenum chamber 44.

To obtain a total flow area of $S_B+S_1$ the valve 56 only would be opened, to obtain a total flow area of $S_B+2S_1$ the valve 58 only would be opened, and to obtain a total flow area of $S_B+3S_1$ the valves 56 and 58 would be opened. To obtain total flow areas of $S_B+4S_1$ and greater, valve 60 only would be opened, or valve 60 would be opened in combination with either of valves 56 or 58, or with both.

More generally we may arrange that $S_{i+1} = F_{i+1} \cdot S_i$ for some $F_{i+1}$, $i<n$ and to allow for those situations where a fixed coefficient would be inappropriate, $F_i \neq F_{i+1}$.

It may be seen that the theoretical advantages of a variable area exit nozzle for the outlet duct may be approached as closely as desired, by employing a sufficient number of valved second plenum chambers and associated exit nozzles, and yet incur none of the disadvantages.

The second plenum chambers may be arranged widthwise across the outlet duct in order of increasing size, but preferably they are arranged so that the second plenum chambers of larger flow area are positioned towards the centre widthwide of the outlet duct to reduce losses in the cooling air flowing to the second plenum chambers.

The valves in the second plenum chambers may not necessarily be restricted to the two state type, i.e. open or closed, but may be of a type which allows progressive variation in cooling air flow through the second plenum chambers between the open and closed positions.

Figure 4:
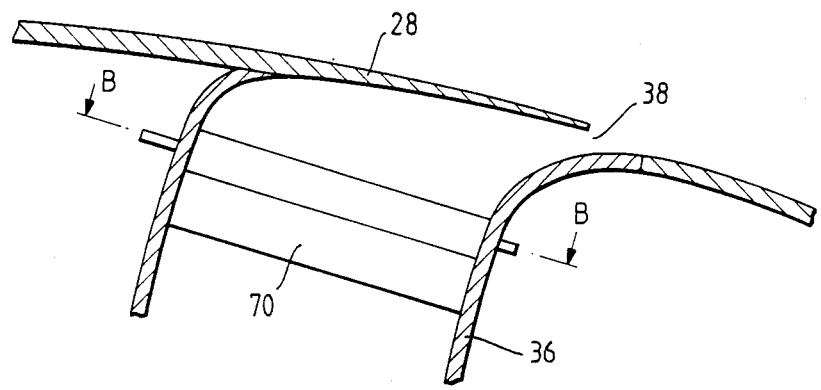
FIG. 4 is an enlarged longitudinal section through a second embodiment of an outlet duct according to the invention.
Figure 5:
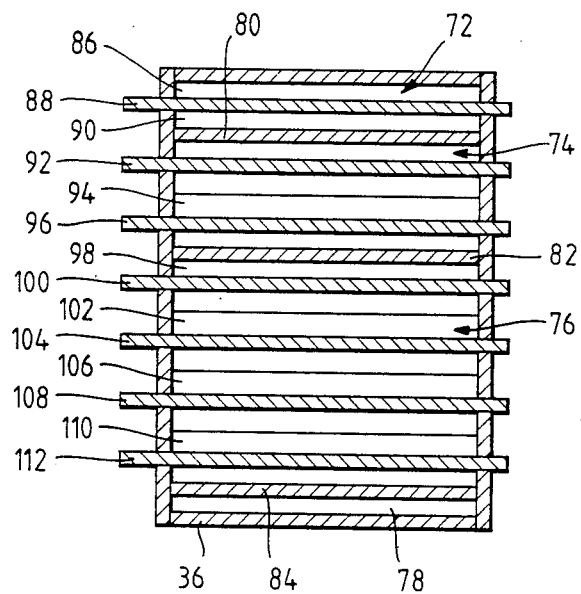
FIG. 5 is a sectional view in the direction of arrows B—B in FIG. 4.

The embodiment in FIGS. 4 and 5 shows an outlet duct 36 according to the invention which comprises a first common plenum chamber 70 which supplies cooling air into a plurality of second plenum chambers 72, 74 and 76 which extend lengthwise of the outlet duct. The second plenum chambers are arranged across the width of the outlet duct, and all have the same longitudinal cross-sectional aerodynamic shape, and are formed by dividing walls 80, 82 and 84 which extend lengthwise of the outlet duct. Each of the second plenum chambers 72, 74 and 76 has a separate exit nozzle which are arranged circumferentially in the fan casing 28 and form a part of the exit nozzle 38. The aerodynamic shape and dimensions of the prior art outlet duct are also preserved in the outlet duct 36.

The second plenum chambers are provided with valves, and in this embodiment louvre valves are used. The second plenum chamber 72 has a single butterfly valve 86 mounted on a spindle 88, second plenum chamber 74 has two ganged butterfly valves 90 and 94 mounted on spindles 92 and 96, and second plenum chamber 76 has four ganged butterfly valves 98,102,106 and 110 mounted on spindles 100, 104, 108 and 112.

A third plenum chamber 78 is also supplied with cooling air from the first plenum chamber 70, and the third plenum chamber extends lengthwise and is arranged across the width of the outlet duct 36 between dividing wall 84 and the outlet duct wall. The third plenum chamber has an exit nozzle, but is not provided with a valve to always allow a cooling airflow therethrough.

The outlet duct in FIGS. 4 and 5 works substantially the same as the embodiment in FIGS. 2 and 3.

Although the figures have shown the outlet duct as comprising a plurality of second plenum chambers which are valved, and a third plenum chamber which is unvalved, it would be possible to have a plurality of second plenum chambers only which are valved, and no third plenum chamber.

I claim:

1. A fluid outlet duct system from a heat exchanger of a gas turbine engine, the fluid outlet duct having a width and a total flow area, the system comprising:
   a first plenum chamber and a plurality of second plenum chambers,
   the first plenum chamber having means for receiving fluid from the heat exchanger,
   the plurality of second plenum chambers being arranged across the width of the fluid outlet duct, the plurality of second plenum chambers having means for receiving fluid from the first plenum chamber,
   each of the second plenum chambers having an associated exit nozzle for discharging the fluid, the exit nozzle of each of the second plenum chambers being located in a casing of the gas turbine engine, the exit nozzle of each of the second plenum chambers having a flow area,
   each of the second plenum chambers having valve means, the valve means being arranged to vary the flow of fluid into each of the second plenum chambers,
   the total flow area of the fluid outlet duct being at least the sum of the flow areas of the exit nozzles of the second plenum chambers for which the valves means are open whereby the valve means may vary the total flow area of the fluid outlet duct to obtain relatively high exit velocities for the fluid discharging from each of the exit nozzles of the second plenum chambers to give good thrust recovery.

2. A fluid outlet duct system as claimed in claim 1 in which a third plenum chamber is arranged across the width of the outlet duct, the third plenum chamber being supplied with fluid from the first plenum chamber, the third plenum chamber having an associated exit nozzle, located in the casing of the gas turbine engine, for discharging the fluid so that there is a minimum flow of fluid at relatively high exit velocities to give good trust recovery.

3. A fluid outlet system as claimed in claim 1 in which each valve means comprises a two position on/off valve.

4. A fluid outlet duct system as claimed in claim 1 in which each valve means comprises a valve whose position is continuously variable between open and closed.

5. A fluid outlet duct system as claimed in claim 1 in which each valve means comprises a butterfly valve, a ganged butterfly valve or a louvre valve.

6. A fluid duct system as claimed in claim 1 in which each of the second plenum chambers and associated exit nozzles have the same flow area.

7. A fluid outlet duct system as claimed in claim 1 in which each of the second plenum chambers and associated exit nozzles have different flow areas, the flow area of the second plenum chambers and associated exit nozzles increasing sequentially.

8. A fluid outlet duct system as claimed in claim 7 in which the flow area of the second plenum chambers increase sequentially by a factor of two.

9. A fluid outlet duct system as claimed in claim 1 in which the heat exchanger is for an accessory gearbox or generator.

10. A fluid outlet duct system as claimed in claim 1 in which the fluid outlet duct is in a fan casing of the gas turbine engine.

* * * * *